US012265881B2

(12) United States Patent
Salim et al.

(10) Patent No.: US 12,265,881 B2
(45) Date of Patent: Apr. 1, 2025

(54) ADAPTIVE QUANTUM SIGNAL PROCESSOR

(71) Applicant: ColdQuanta, Inc., Boulder, CO (US)

(72) Inventors: Evan Salim, Boulder, CO (US); Dana Zachary Anderson, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 1024 days.

(21) Appl. No.: 17/175,889

(22) Filed: Feb. 15, 2021

(65) Prior Publication Data

US 2022/0012618 A1    Jan. 13, 2022

Related U.S. Application Data

(60) Provisional application No. 63/049,248, filed on Jul. 8, 2020.

(51) Int. Cl.
*G06N 10/00* (2022.01)
*G06N 5/04* (2023.01)
*G06N 20/00* (2019.01)

(52) U.S. Cl.
CPC .............. *G06N 10/00* (2019.01); *G06N 5/04* (2013.01); *G06N 20/00* (2019.01)

(58) Field of Classification Search
CPC ........... G06N 10/00; G06N 20/00; G06N 5/04
USPC ........................................................ 706/12
See application file for complete search history.

(56) References Cited

U.S. PATENT DOCUMENTS

| 10,990,677 | B2  | 4/2021  | Wiebe et al. |
| 11,030,548 | B1  | 6/2021  | Ding et al. |
| 2017/0364796 | A1 | 12/2017 | Wiebe et al. |
| 2019/0220497 | A1* | 7/2019 | Wiebe ..................... G06F 17/12 |
| 2020/0090072 | A1* | 3/2020 | Troyer ..................... G06N 5/01 |

OTHER PUBLICATIONS

Pedro Aguilera, "A Quantum Theory Inspired Framework for Adaptive Signal Processing", IEEE Chile Centro Section (Website https://ieeechile.cl/a-quantum-theory-inspired-framework-for-adaptive-signal-processing/), Jan. 14, 2020, Chile.

(Continued)

*Primary Examiner* — Tsu-Chang Lee
(74) *Attorney, Agent, or Firm* — Michael J. Attisha; Samuel Means; Greenberg Traurig, LLP

(57) ABSTRACT

An adaptive quantum signal processor (AQSP) includes a signal combiner, a physics station, a measurement system, a machine-learning engine and an output generator. The signal combiner combines incoming signals with control functions to yield recipe functions. For example, the recipe functions can be "shaking" functions used to change the wavefunctions of atoms entrained in an optical lattice. The recipe functions are applied to wavefunctions in initial wavefunction states causing the wavefunctions to transition to signal-impacted states. The measurement system measures the wavefunctions in their signal-impacted quantum states to yield wavefunction characterizations. The machine-learning engine updates control functions based on the wavefunction characterizations. The output generator outputs results based on the wavefunction characterizations and/or control function characterizations. In a matched-filter application, the outputs characterize (e.g., identify, classify, rate) the incoming signals.

20 Claims, 11 Drawing Sheets

(56) References Cited

OTHER PUBLICATIONS

Raphael Smith, Adrian Basarab, Bertrand Geogeot, Denis Koame, "Adaptive transform via quantum signal processing: application to signal and image denoising", arXiv:1802.02358v1 [eess.SP] Feb. 7, 2018, France.

Robert L. Kosut, Hersch Rabitz, Matthew D. Grace, "Adaptive quantum control via direct fidelity estimation and indirect model-based parametric process tomography" SAND2013-7871C, 2013, US.

* cited by examiner

ADAPTIVE QUANTUM SIGNAL PROCESSOR

BACKGROUND OF THE INVENTION

Quantum technology encompasses a host of emerging applications, such as quantum computing, quantum sensors, quantum cryptography, quantum simulation, quantum metrology, and quantum imaging. While it offers many advantages over technology based on conventional methods of sensing and information processing, quantum technology must still interface with the more prevalent and generally more familiar technologies based on classical mechanics.

DETAILED DESCRIPTION

Figure 1:
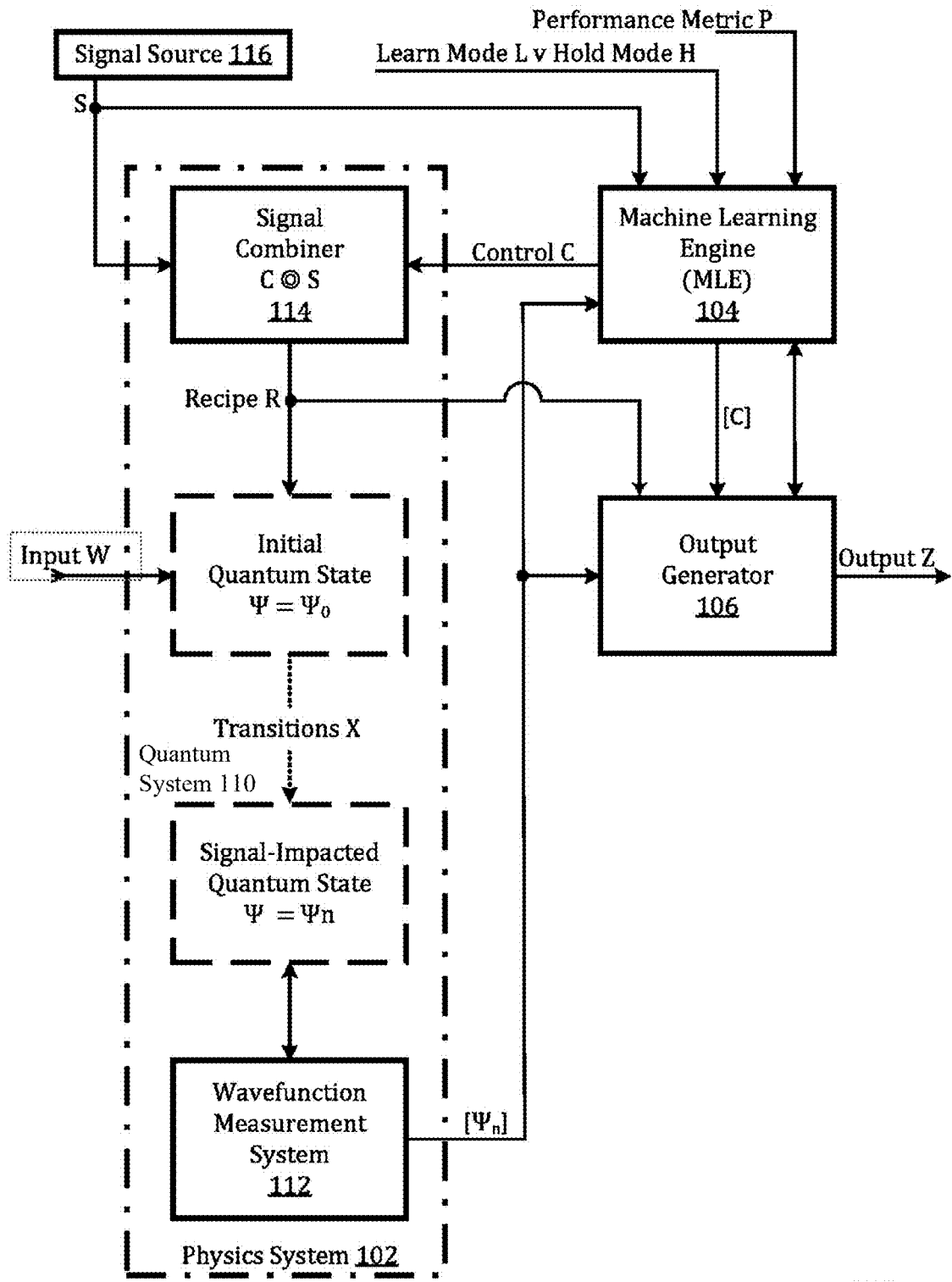
FIG. 1 is a diagram of an adaptive quantum signal processing (AQSP) system.

The present invention provides an adaptive quantum signal processing (AQSP) system 100 that includes a physics system 102, a machine learning engine 104, and an output generator 106. Physics system 102 serves as an environment to maintain a quantum system 110 characterized by a wavefunction Ψ. In addition, physics system 102 includes a wavefunction measurement system 112 and a signal combiner 114. Measurement system 112 takes measurements of wavefunction Ψ; these measurements can serve as characterizations [Ψ] of wavefunctions Ψ. Transitions X between initial wavefunction states $\Psi_0$ and respective signal-impacted wavefunction states $\Psi_n$ can be caused or affected by respective recipe functions R.

Signal combiner 112 combines incoming signals S from a source 116 with control functions C to yield recipe functions R. Machine learning engine (MLE) 104 produces control functions C based on wavefunction characterizations [Ψ] and a performance metric P; in some applications, performance metric P requires that MLE 104 also be responsive to signals S. Output generator 106 generates outputs Z for AQSP 100 based on one or more of wavefunctions Ψ or their characterizations [Ψ], control functions C or their characterization [C], and recipe functions R. AQSP system 100 can support a variety of applications, for example, depending on whether the signals S are to be characterized or otherwise processed, quantum system 110 is to be characterized, or a phenomenon W sensed by quantum system 110 is to be evaluated.

Figure 2:
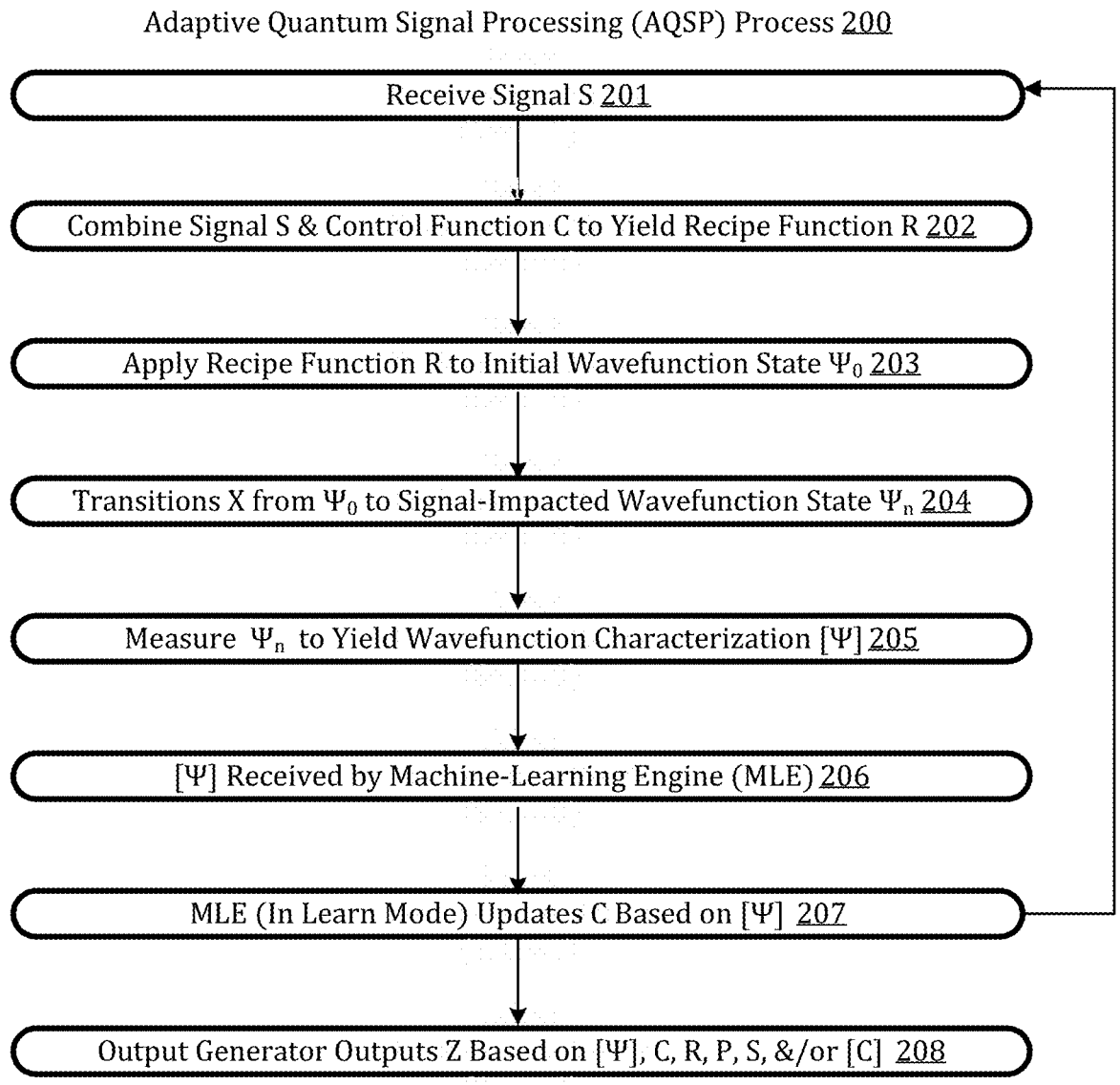
FIG. 2 is a flow chart of an AQSP process.

An AQSP process 200 is flow charted in FIG. 2. At 201, a signal S is received from signal source 116, which may be a known source or an unknown source, depending on the application. Herein, "signal" encompasses information-carrying waveforms including time-varying electrical, magnetic, electro-magnetic, and optical phenomenon. At 202, the received signal is combined with a control function C, which is, itself, a signal. Signal combiner 114 (FIG. 1) combines signal S with control function C to produce a recipe function R=C⊚S, where "⊚" is a generic symbol for a combining operation such as addition, multiplication, modulation, etc. If the signal S cannot be readily combined as-is, the combining can involve transforming S so that it can be combined or so that the combination is in a more useful form. For example, signal S may be scaled or even converted (e.g., from a microwave signal to an electrical signal). The result of the combination is recipe function R. In some embodiments, the signal combiner produces intermediate results and derives recipe function R from the intermediate results.

At 203, recipe function R is applied to an initial wavefunction state $\Psi_0$. Initial wavefunction state $\Psi_0$ may be known or unknown. For example, wavefunction state $\Psi_0$ may be known because it results from a preparation known to produce such a wavefunction. Wavefunction state $\Psi_0$ may be unknown because it had been involved in sensing a time-varying phenomenon.

In either case, at 204, application of recipe function R can cause or contribute to a series X of n transitions to a signal-impacted wavefunction state $\Psi_n$, wherein n=1 (in degenerate case), 2, or 3, etc. "Cause" in this context implies that changes in the wavefunction are due entirely or predominantly due to the application of the recipe function R to the wavefunction. "Contribute" in this context implies that significant changes in the wavefunction are due to factors in addition to the application of the recipe function R.

For one example of a "contribution", a treatment, e.g., involving entanglement, that would change the wavefunction even in the absence of the recipe function could be applied contemporaneously with the recipe function R. For a second example, the wavefunction could be used to sense a phenomenon that changes independently of the recipe function R while the recipe function R is applied to the wavefunction. For a third example, quantum system 110 can be used as an inertial sensor; data from a pilot's instruction (or from a classical inertial sensor) can be fed forward onto the wavefunction state to basically subtract off an anticipated signal so that the difference can be measured. Wavefunction measurement system 112 can be used at 205 to characterize wavefunction state $\Psi_n$ in classical terms to yield a classical-domain characterization [Ψ] (aka [$\Psi_n$]) of wavefunction Ψ in signal-impacted wavefunction state $\Psi_n$.

At 206, wavefunction characterization [Ψ]. is received (directly or indirectly) by MLE 104. At 207, in the event that it is in its learn mode L, MLE 104 applies performance metric P to wavefunction characterization [Ψ] to evaluate and possibly update control function C. For example, if wavefunction characterization [Ψ] does not equal a target result, C may be updated in the course of converging to the target result. In the event that, at 207, MLE 104 (FIG. 1) is in hold mode H, performance parameter P need not be applied and control function C is not updated. For example, once the target result is achieved with a given C using template signals S, hold mode can be enabled so that C remains constant even though subsequent signals S vary.

MLE 104 can be set to use any one of or combinations of learning algorithms to determine control function C including, but not limited to a genetic algorithm (GA), a CRAB method, a Krotov method, and a Nelder-Mead algorithm. The general idea is for the machine-learning engine to apply a set of different control-function candidates to yield respective end wavefunctions and respective wavefunction characterizations. The respective wavefunction characterizations can be used to evaluate the control-function candidates according to a performance metric (which can include a fitness function and a criterion for determining when to stop searching for better candidates). The evaluations can be used to generate a new set of control-function candidates, at least some of which may perform better than any of those used in the previous set The sequence 201-207 can be iterated while machine learning engine 104 is in learn mode L. If signal source 116 outputs a series of replicas of a template signal to be combined with a succession of updated control functions, the control functions may converge on an optimum target value as determined by performance metric P. In some embodiments, once the target value is achieved, MLE 104 can be switched to hold mode in which the control function C is no longer updated and but is held constant; this optimum control function C can then be used to process various signals S, e.g., to detect matches to the template signal and/or evaluate deviations from the template signal.

In other embodiments, the MLE remains full-time in learning mode, providing for continuous adapting. If the incoming signals vary during learning mode, control function C may converge, at least temporarily, on a range of values, which can, in some scenarios, force sensor readings into or out of a range in which the wavefunction responds with greatest sensitivity. Thus, the tradeoff between range and sensitivity can be selected by adjusting the performance metric.

At 208, output generator 106 can provide an output Z. Depending on the application and the scenario, output generator 106 can provide an updated output every iteration of actions 201-207, or on some other basis. The output Z can be directly or indirectly based on wavefunction characterization [Ψ]. In addition, output Z can be based on signals S, performance parameters P, control functions C, and/or recipe functions R.

Control functions C can be generated by MLE 104 based on a mathematical expression, e.g., a polynomial expression; the specific form of control function C is then determined by the values of coefficients in the expression. In learning mode, the control function is updated by updating these coefficients. Therefore, a given control function can be efficiently characterized by a multi-dimensional vector [C] in coefficient space. Since, in MLE learning mode, control function characterization[C] is updated based on [Ψ], a series of control-function characterizations [C] can contain much the same information as a series of wavefunction characterizations [Ψ], but may be in a more useful form for some purposes. Accordingly, output Z can be based on [C] in addition to or in lieu of other factors mentioned above.

Figure 3:
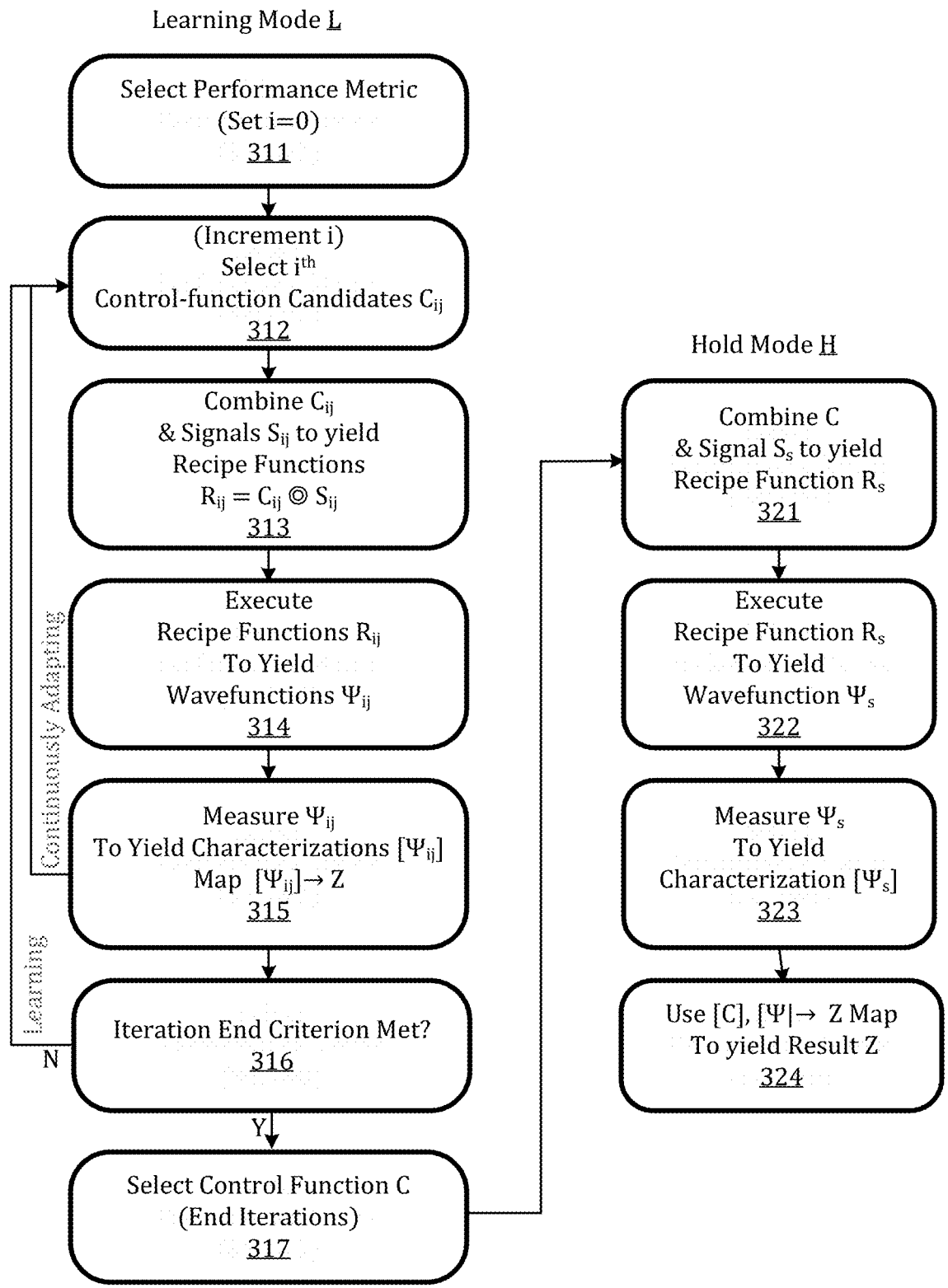
FIG. 3 is a flow chart of a learning mode and hold mode process.

A machine-learning process 300, flow-charted in FIG. 3, demonstrates the usage of the learning mode L and the hold mode H. In learning mode L, at 311, a performance metric P is provided. Performance metric P can include a fitness function that can be used to rate control-function candidates; P can also include an iteration or other search end criterion. Factors to consider can include how close the wavefunction achieved by the best available control-function candidates is to a target wavefunction, how many iterations have been completed, and how much improvement has been realized in recent iterations. In some embodiments, a mapping of wavefunction characterizations to signal characterizations can be specified; in other embodiments, the mapping can be generated during learning. Also, in the illustrated embodiment, an iteration index i is initialized to zero (i=0).

At 312, i is incremented (increased by 1). Therefore, for the first iteration, i is incremented from zero to one. In the first iteration, a first set of control-function candidates $C_{1j}$ is provided to or selected by the machine-learning engine. ("j" is an index for the control-function candidates within each iteration i.) In subsequent iterations, an $i^{th}$ set of control function candidates $C_{ij}$ is selected by the machine-learning engine, typically by applying the performance metric P to the results from the immediately prior and/or other prior iterations.

At 313, in each iteration, the control-function candidates $C_{ij}$ for the iteration are respectively combined with signals $S_{ij}$, which, in some scenarios, may be replicas of each other. In other words, the signals used during learning mode L may be pre-labeled and/or instances of a common template. The results of the combining are respective recipe functions $R_{ij}=C_{ij} \otimes S_{ij}$.

At 314, recipe functions $R_{ij}$ are executed to yield respective end wavefunctions $\psi_{ij}$. In the illustrated embodiments, the recipe functions are applied to a physics system with a common initial wavefunction. Typically, not all the end wavefunctions are the same (congruent) so that there is at least one pair of incongruent end wavefunctions. In an alternative embodiment, not all initial wavefunctions are congruent (equal).

At 315, the end wavefunctions $\Psi_{ij}$ are measured to yield wavefunction characterizations $[\Psi_{ij}]$. The end wavefunctions $\Psi_{ij}$ are measured tomographically in that control-function candidates $C_{ij}$ and the signals $S_{ij}$ with which the candidates are combined are used to generate multiple instances of $\Psi_{ij}$ so that a statistical distribution of measurements can be used to characterize the probabilistic distribution of the $\Psi_{ij}$ wavefunction. In a continuously adapting embodiment, process 300 returns to 312 to select a next set of control-function candidates. In an embodiment with separate learn and hold modes, process 300 continues to 316.

At 316, a determination is made whether or not the iteration-end criterion has been met. Typically, the iteration-end criterion would not be met after only the first iteration has been completed. In the event that the iteration-end criterion has not been met, learning mode L continues by returning to 312, which calls for incrementing i. For example, after the first iteration, i is incremented from 1 to 2. A new set of control-function candidates $C_{2j}$ is selected, typically based on the results of the immediately prior iteration. In embodiments, some of the better performing candidates for the preceding iteration can be retained while others are discarded in favor of new candidates generated based on the better performing candidates from the previous iteration.

In the event that, at 316, the iteration-end criterion is met, then the best performing candidate of the current iteration can be selected as the control function to be used in hold mode H. Alternatively, the selected control function need not be one of the prior candidates, but another function generated based on the results of the candidates. Process 300 then proceeds to hold mode H.

At 321 of hold mode H, the control function C is combined with a signal $S_s$ (where "s" is an index) to yield respective recipe functions $R_s$. Herein, a "recipe" is a document that specifies "ingredients" and instructions for inducing physical transformations leading to a given end state, in this context, a wavefunction state. Herein, a "recipe function" is an executable ingredient of a recipe that, when executed, contributes to the achievement of the end state. Accordingly, at 322, the recipe functions are executed to yield their respective end-wavefunction states $\psi_s$.

At 323, the resulting wavefunction states are characterized. As with action 315, observables characterizing the wavefunction can be returned, e.g., in response to a probe by a wavefunction measurement system. Characterizations [Ψ] are generated from the observables. At 324, the characterizations can be input to the [Ψ]>Z (e.g., =[S]) map to yield results Z. Alternatively, the control function or the characterization [C] used to generate the control function can be mapped to output Z.

Hold mode 320 actions 321 and 322 serve to map classical signals to wavefunctions. Action 324 is the reverse map of wavefunctions (represented by their characterizations) back to the classical characterizations of respective signals according to their identity, class, and/or rating. In an alternative scenario, hold mode is not used, and the control functions C or, instead, their characterizations [C], are mapped to Z.

In a matched filter embodiment, a AQSP system serves as a shaken-lattice matched filter that finds matches by comparing quantum wavefunctions. An optical lattice can be "shaken" by varying the phase or frequency relationship between interfering laser beams. The phase changes cause the interference fringes, which define the trap boundaries, to move. The movement of trap boundaries can be used to manipulate the quantum wavefunction; for example, a stationary population of molecules distributed in a lattice can be coherently split into two counterpropagating populations. One advantage of a shaken-lattice matched-filter is that it can be readily integrated into other shaken-lattice instruments, including shaken-lattice interferometers and gyroscopes.

The lattices of interest herein are arrays of potential wells formed using interfering laser beams, in some cases supplemented by magnetic fields. The potential wells serve as traps for atoms (or polyatomic molecules). Herein, "molecule" refers to the smallest particle of a substance that retains all the properties of the substance and is composed of one or more atoms; this definition, which is set forth in the *Merriam Webster Dictionary,* encompasses monatomic (single-atom) molecules as well as polyatomic molecules. Thus, gas-phase alkali (e.g., potassium, rubidium, and cesium) atoms used in embodiments herein qualify as molecules under this definition. An alternative definition set forth in the *IUPAC Gold Book,* "An electrically neutral entity consisting of more than one atom", is not used herein.

The matched filter aspires to detect matches between signals that have the same effect on molecules in a lattice when used as shaking functions for the lattice that confines the molecules. However, not all signals impact the wavefunction of the molecules. Accordingly, the present invention calls for combining signals of interest with a control functions to yield a recipe function that results in a desired effect on the wavefunction of molecules entrained in an optical lattice.

Figure 4:
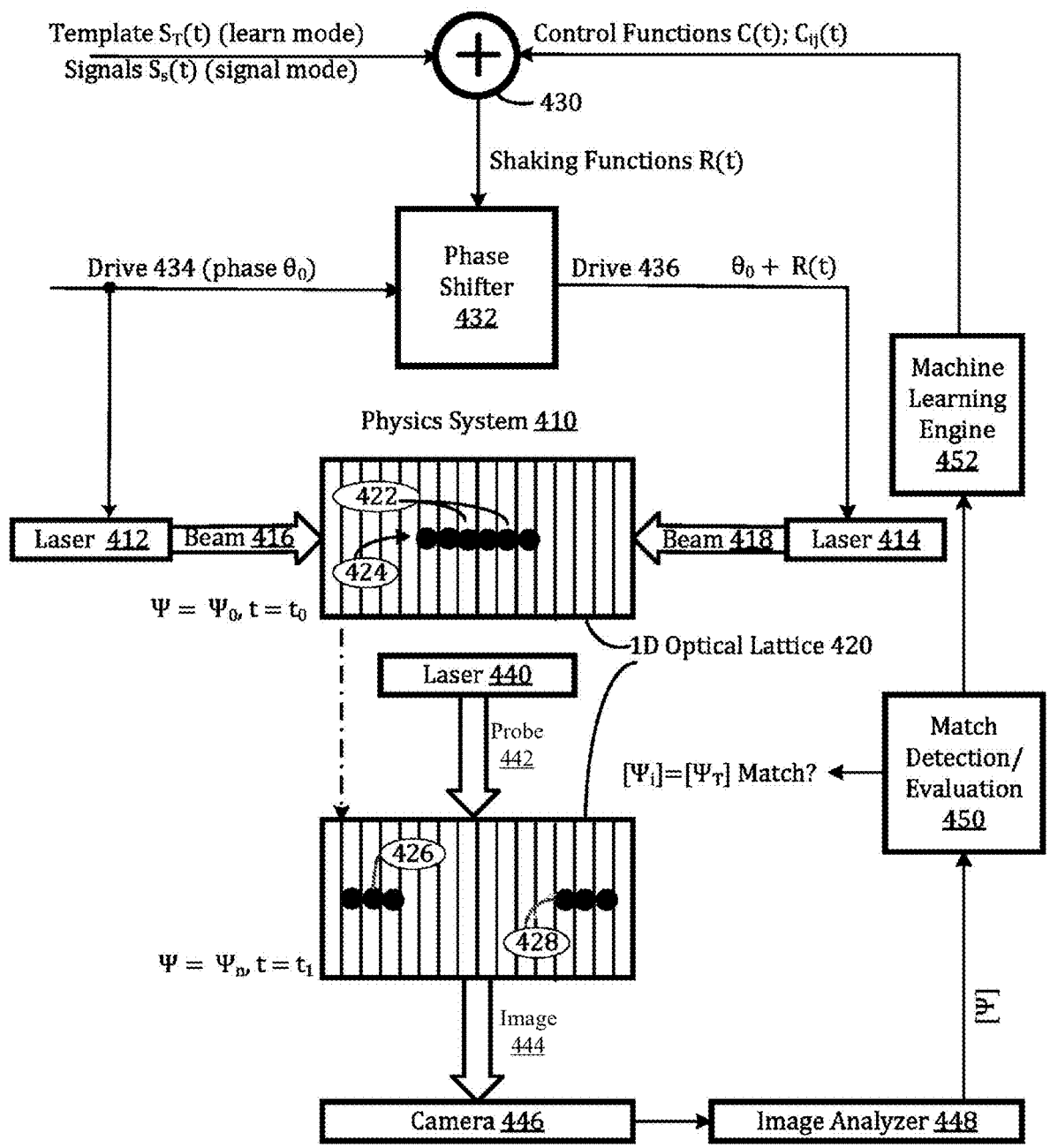
FIG. 4 is a schematic diagram of a shaken-lattice matched-filter system.

For example, a shaken-lattice matched-filter system 400, shown schematically in FIG. 4, provides for evaluating respective matches of signals $S_s(t)$ with a template $S_T(t)$, using a shaken lattice generated by and within a physics system 410. Matched filters are used to detect signals that match templates (reference waveforms) and haveg applications including in radar, sonar, digital communications, image processing (e.g., of X-Ray images), and gravitational-wave astronomy. Prior-art matched filters include electronic devices that, in effect, convolve the signal with a conjugated time-reversed version of the template.

Physics system 410 includes a pair of lasers 412 and 414 that generate respective ones of counter-propagating red-detuned laser beams 416 and 418. Counter-propagating laser beams 416 and 418 interfere to form an at least one-dimensional (1D) optical lattice 420. While, in system 400, beams 416 and 418 are output from respective lasers 412 and 414, in alternative embodiments, the output of a single laser is split and the resulting branches are redirected to define counter-propagating beams.

Optical lattice 420 is populated by molecules 422, which are shown at time $t=t_0$ in an initial quantum state corresponding to an initial wavefunction state $\Psi_0$, forming a centrally-located cluster 424. In the illustrated scenario, the molecules are monatomic molecules, namely, rubidium 87 atoms. Where the molecules in the lattice are alkali metal or other atoms, they are referred to herein as "atoms", with the understanding that the invention also provides for the use of polyatomic molecules.

System 400 provides for shaking lattice 420 so that atoms 422 transition to at least one other state. In the illustrated scenario, atoms 422 transition from initial wavefunction state $\Psi_0$ to a second and final wavefunction state $\Psi_n$, shown in FIG. 1 at time $t=t_1$. In the case of end wavefunction $\Psi_n$, atoms 422 are split into two clusters 426 and 428 located at either side of the lattice center. In general, each succeeding state differs from its immediate predecessor; thus, in a single-transition two-state sequence, the second and final state differs from the initial state. However, where multiple state transitions are implemented, it is possible that the final transition features a return to an initial state or to some other state that is not its immediate predecessor.

As explained above, "shaking" of a lattice is effected by varying phases or frequencies of counter-propagating beams used to form the lattice. In the illustrated scenario, beam 416 maintains a constant frequency and phase $\theta_0$, while the phase of beam 418 varies relative to the phase of beam 416 according to a time-varying shaking function R(t), which corresponds to recipe function R of system 100 in FIG. 1. In alternative scenarios, the phases of both of a pair of counter-propagating beams can be varied.

Figure 5:
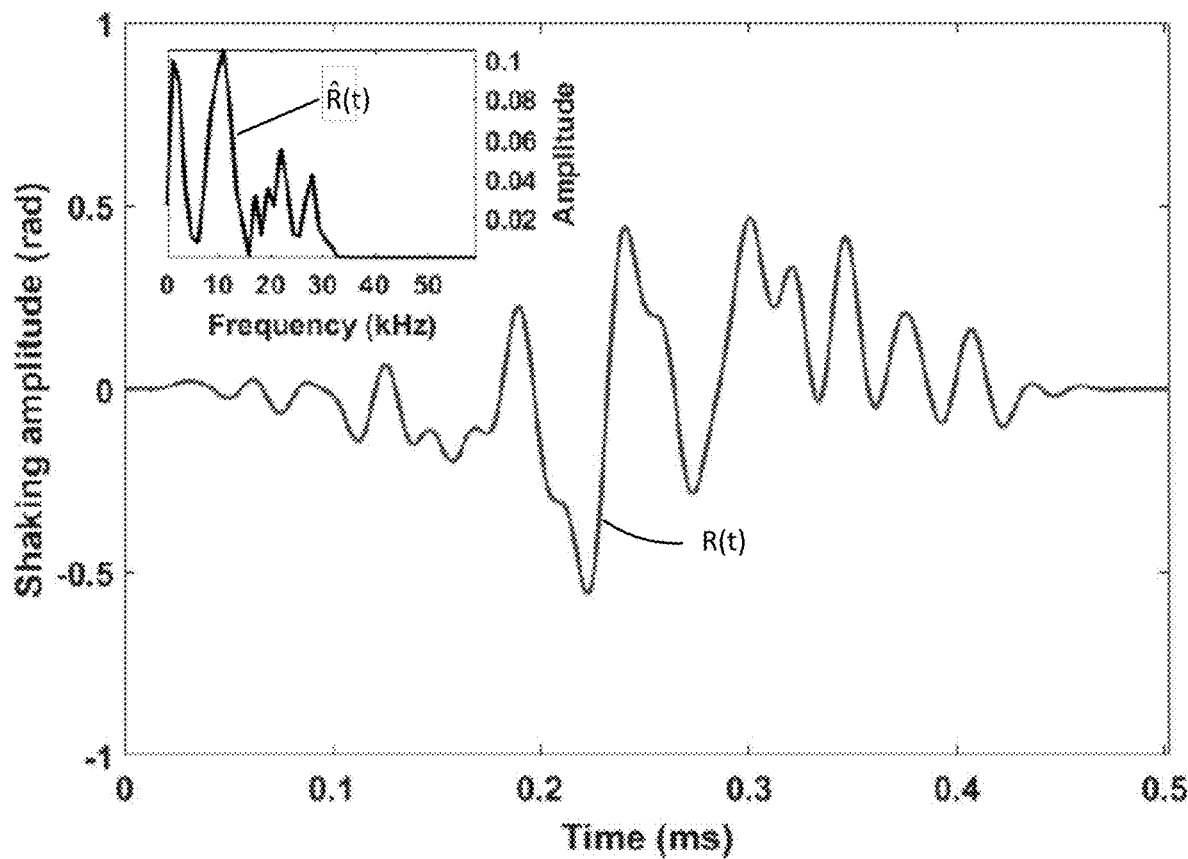
FIG. 5 is a graph of a shaken-lattice waveform, the graph including an inset showing a Fourier transform of the shaken-lattice waveform.
Figure 6:
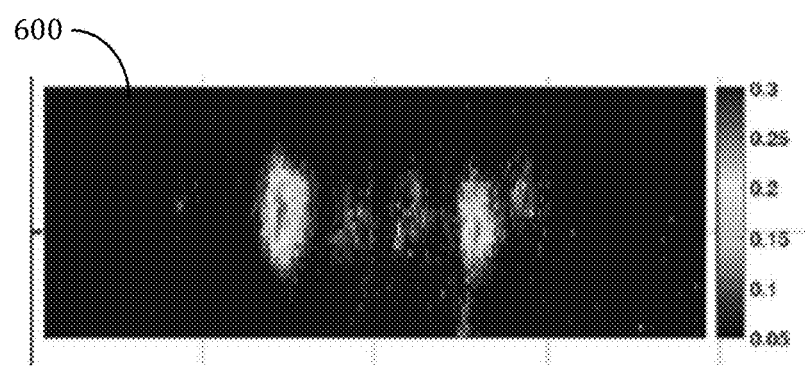
FIG. 6 is an image of a split distribution of atoms into sub-populations resulting from application of the shaken-lattice waveform of FIG. 5 in the system of FIG. 4.

An exemplary shaking function R(t), shown in the graph of FIG. 5, can be applied to atoms in a ground Bloch state of the lattice to cause them to split. A Fourier transform $\hat{R}(t)$ of shaking function R(t) is shown in the inset of FIG. 5. FIG. 6 is an image 600 taken of the end (split) wavefunction state resulting from application of shaking function R(t) to physics system 410 (FIG. 4).

In signal (hold) mode, a received signal $S_s$ is combined with a complement C(t) of the template $S_T(t)$ with which signal $S_s$ is to be compared. Herein, a "complement" is defined relative to a given shaking function and combination operation and denotes a function that when combined using the given operation with the respective template $S_T(t)$ yields the given shaking function R(t). Thus, in general, $S_T(t) \odot C(t) = R(t)$, where "$\odot$" is a generic symbol for an unspecified operator. In system 400, the signal computer is a signal adder 430 that adds an incoming signal to the complement, implying that $S_T(t) + C(t) = R(t)$. Thus, for example, $S_s(t) \odot C(t) = R_s(t) = R(t)$ implies $S_s(t)$ matches $S_T(t)$. The assumption herein is that if $R_s(t)$ and $R(t)$ produce the same end wavefunction, then $R_s(t)=R(t)$ and, thus, signal $S_s(t)$ matches template $S_T(t)$.

Shaking function $R_s(t)$ is input to a phase shifter 432, which shifts the phase of the incoming drive signal 434 (with phase $\theta_0$) by $R_s(t)$ to yield drive signal 436 with phase $\theta_0+R_s(t)$. Drive signal 434 drives laser 412 and so determines the phase $\theta_0$ of beam 416; drive signal 436 drives laser 414 and thus determines the phase $\theta_0+R_s(t)$ of beam 418. In general, $R_s(t)$ is a time-varying function, so the phase of beam 418 varies relative to the phase of beam 416, effecting the so-called shaking of lattice 420.

A probe laser 440 directs a probe beam 442 through lattice 420 to observe the post-shaking wavefunction $\Psi$ of atoms 424. A resulting image 444 is captured by camera 446 and analyzed by image analyzer 448 yielding a wavefunction characterization $[\Psi]$, which image analyzer sends to match detector 450. In the illustrated embodiment, the characterization $[\Psi]$ indicates whether or not population 424 has split and, if so, what the centroid separation is between the two sub-populations 426 and 428.

Match detector 450 can compare the characterization of the end wavefunction effected by the signal $S_s(t)$ with the end wavefunction caused by the template $S_T(t)$. If they are the same, a match is indicated. For example, in the illustrated system 400, if population 424 splits into sub-populations and if they are separated by the same amount for a given time-of-flight that they would have been had $S_T(t)$ been the signal, then a match is indicated. If there is no split, then non-match is indicated. If signal $S_s$ causes a split but with a different separation, then the difference between the separations due to $S_T(t)$ and $S_s(t)$ can be used to quantify/evaluate the closeness of an imperfect match.

The degree of a match can be a useful measure for ranking candidates $C_{ij}(t)$ for control-function $C(t)$ for a given template $S_T(t)$ during a learning mode. In this learning mode, a machine-learning engine 452 implements an iterative approach designed to converge on a suitable complement $C(t)$ for a given template $S_T(t)$. In each iteration, machine-learning engine 452 specifies a set of candidates $C_{ij}(t)$ for $C(t)$, where $C_{ij}(t)$ is the $j^{th}$ candidate in the $i^{th}$ iteration. Instances of the template $S_T(t)$ are then combined with respective candidates $C_{ij}(t)$ at adder 430 to yield corresponding shaking functions $R_{ij}$. Match detector/evaluator 450 then scores the control-function candidates based on how close they came to achieving the target end wavefunction state.

Machine-learning engine 452 uses these scores to rank the control-function candidates $C_{ij}(t)$ for the current iteration. The worst performers are discarded, while the remaining "elite" are retained for the next iteration and are also combined (aka, "mated") with each other to generate replacements for the discarded candidates. The highest ranked candidate for the last iteration can be selected as $C(t)$ to be used for identifying matchings signals as described above.

Figure 7:
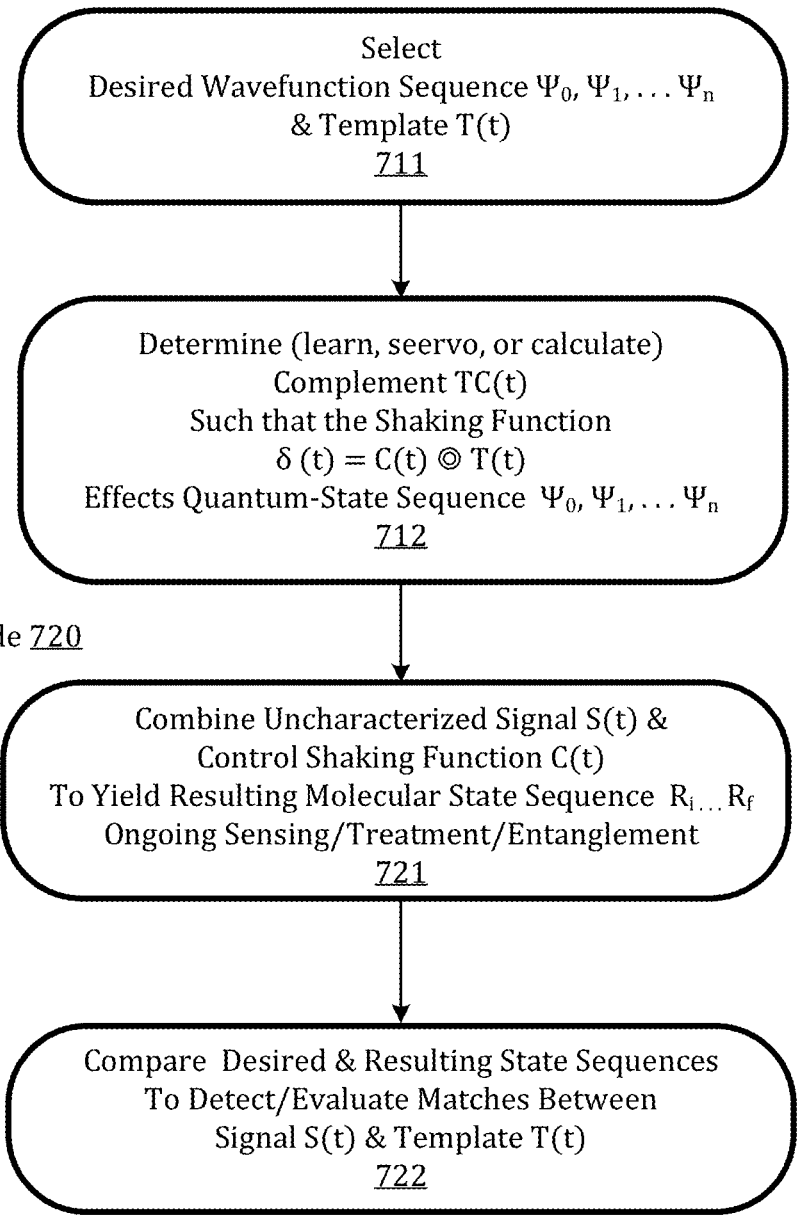
FIG. 7 is a flow chart of a shaken-lattice matched-filter process.

A shaken-lattice matched-filter process 700, flow-charted in FIG. 7, can be implemented in system 400 and in other systems. Process 700 includes a learning mode 710 and a match (aka "hold") mode 720. Learning mode 710 provides for, at 711, selecting a desired wavefunction state sequence $\Psi=\Psi_0, \Psi_1, \ldots \Psi_N$ and a template $S_T(t)$. By "template" is meant a waveform against which signals are compared to determine whether or not the signals match the template. For example, a recording of someone saying "hello" can serve as a template for detecting matches and for evaluating their similarity or dissimilarity with the original "hello".

At 712, in learning mode, a control function $C(t)$ is determined, e.g., calculated or learned. In system 400, the shaking function $R(t)$ equals the sum of the template $S_T(t)$ and the control function $C(t)$. $S_T(t)+C(t)=R(t)$, so $C(t)=R(t)-S_T(t)$. More generally, where $S_T(t) \odot C(t)=R(t)$, where "$\odot$" is a generic symbol for an operator, then $C(t)=R(t)\odot^{-1}S_T(t)$, where $\odot^{-1}$ the inverse of $\odot$. However, one or more of $R(t)$, $\odot^{-1}$, $S_T(t)$ may not be known explicitly, and even where all three are known, the calculations may be infeasible. Also, since the combining operation $\odot$ is performed by a physical device, e.g., signal adder 430 (FIG. 4), non-idealities can make characterizations of an operator imprecise. For these reasons and others, an empirical iterative trial-and-error approach is appropriate.

For example, a servo approach can be used in which detected differences between the actual end wavefunction and the template-induced end wavefunction are used to generate an error signal. Progressive adjustments to $C(t)$ can be made to minimize the error. However, this approach may find a local minimum other than the global minimum for the control function, so an alternative empirical approach is preferred. Several machine learning approaches turn out to be effective in converging to $C(t)$. These approaches try multiple control-function candidates $C_{ij}(t)$ for each of several iterations, increasing the likelihood of finding a global rather than local minimum. For example, an approach using a "genetic" algorithm, explained in greater detail below, can be used.

In match mode, at 721, an uncharacterized signal $S_s(t)$ is combined with a control function $C(t)$ for a template $S_T(t)$ to which signal $S_s(t)$ is to be compared. The result is a shaking function $R_s(t)$ that, in turn, results in a resulting wavefunction state sequence $\Psi=\Psi_0, \Psi_1, \ldots \Psi_n$. At 722, this resulting wavefunction state sequence is compared with desired wavefunction state sequence to detect/evaluate a match between $S_s(t)$ and template $S_T(t)$.

During 721, factors other than the shaking (recipe) function can affect the resulting wavefunction state sequence. For example, physics system 410 can be used as a sensor, e.g., an inertial sensor or a sensor for an electrical, magnetic, electro-magnetic or optical field. In that case, the resulting molecular state sequence can be based on changes in the phenomenon being sensed as well as the shaking function. For another example, atoms 422 can be subjected to ongoing treatment, e.g., atoms can be excited to Rydberg states so that they interact and become entangled during action 721. This entanglement or other ongoing treatment can affect the outcome of action 721.

Signals $S_s(t)$ can be provided by a inertial sensor that has relatively low precision due to its reliance of classical mechanics technology. The control function $C(t)$ is updated as a function of wavefunction characterization $[\Psi]$ to keep the interferometer near a region of maximum sensitivity near the center of the interference pattern to provide highly precise least-significant bits in the inertial sensor readout. Since wavefunction characterization $[\Psi]$ is biased by the control function $C$, control function characterization $[C]$ can be used to reverse the bias and supply the most significant bits to the inertial sensor readout.

Figure 8:
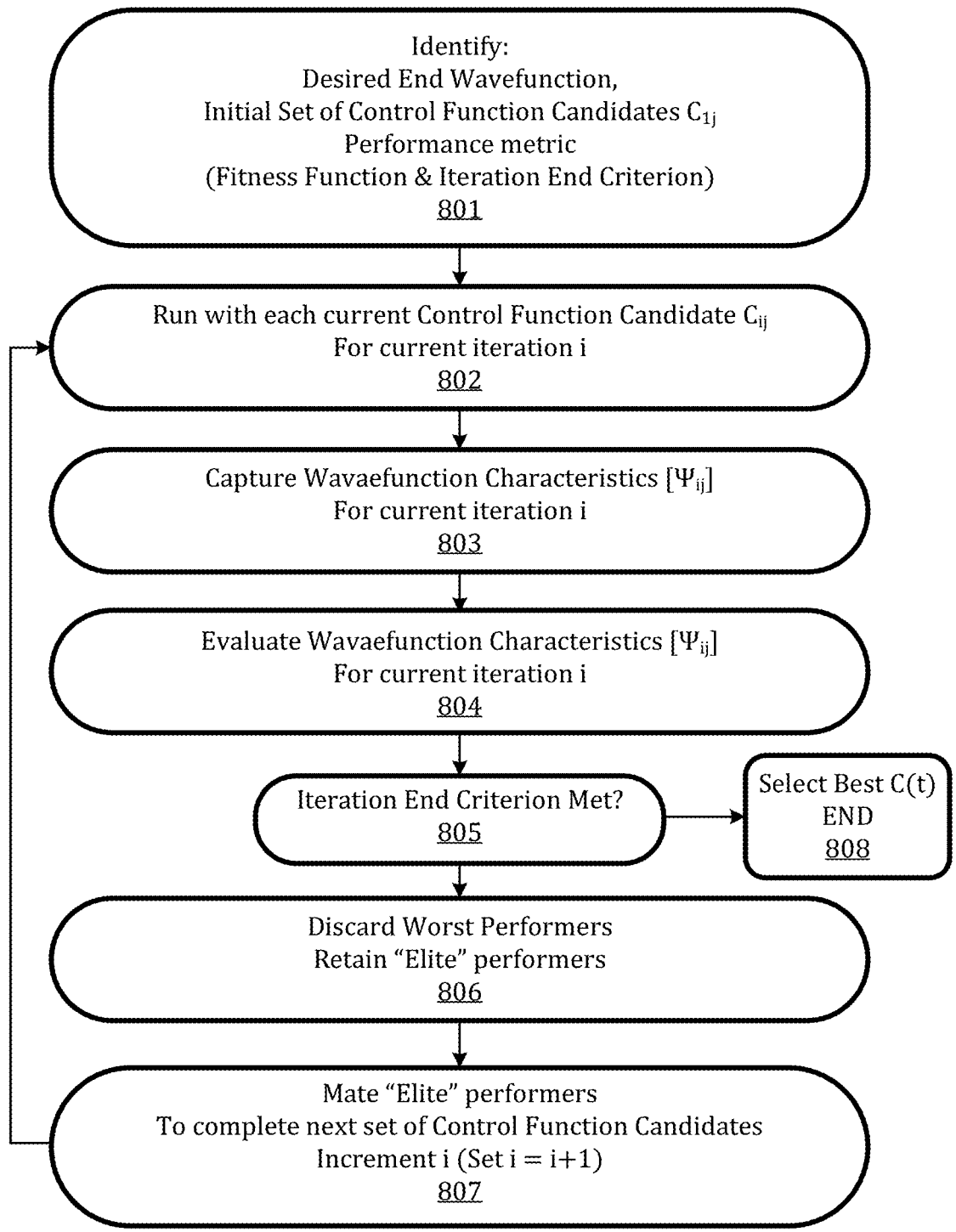
FIG. 8 is a flow chart of a learning-mode sub-process of the process of FIG. 7.

A shaken-lattice learning-mode process 410 is flow-charted in FIG. 8. At 801, a desired end wavefunction state, an initial set of candidate complements $C_{ij}$, a performance metric including a fitness function, and an iteration-end criterion are identified. As indicated earlier, i is an iteration index and j is a candidate index within an iteration so that $C_{ij}$ is the $j^{th}$ candidate during the $i^{th}$ iteration.

At 802, each control-function candidate $C_{ij}$ for the current iteration is combined with the template $S_T(t)$ to yield a candidate shaking function $R_{ij}(t)$. Depending on the embodiment, candidates of the current iteration that were run in a previous iteration need not be run in the current iteration. At 803, wavefunction characteristics [$\Psi_{ij}$] for each run for the current iteration are determined, e.g., by obtaining and analyzing an image of the end wavefunction for the runs. At 804, the wavefunction characteristics [$\Psi_{ij}$] are evaluated so that the candidates of an iteration can be ranked and/or scored.

At 805, a determination is made whether or not an iteration end criterion has been met. The criterion can include a number of factors: how many iterations have been executed, how close is the best result so far, how much improvement has been achieved in the latest iterations. At least for the first iteration, this criterion is usually not met.

In the event that the iteration criterion has not been met for the current iteration, the worst performing control-function candidates are discarded at 806. At 807, the remaining "elite" control-function candidates are "mated" to give birth to replacements for the discarded candidates. Process 410 then returns to 802 to begin the next iteration. In the flow chart, the iteration number i is incremented, i.e., so that i+1→i. During some iteration, the iteration-end criterion is met at 805. In that case, the best performing candidate is selected as the control function C(t) for use in signal mode.

Figure 9:
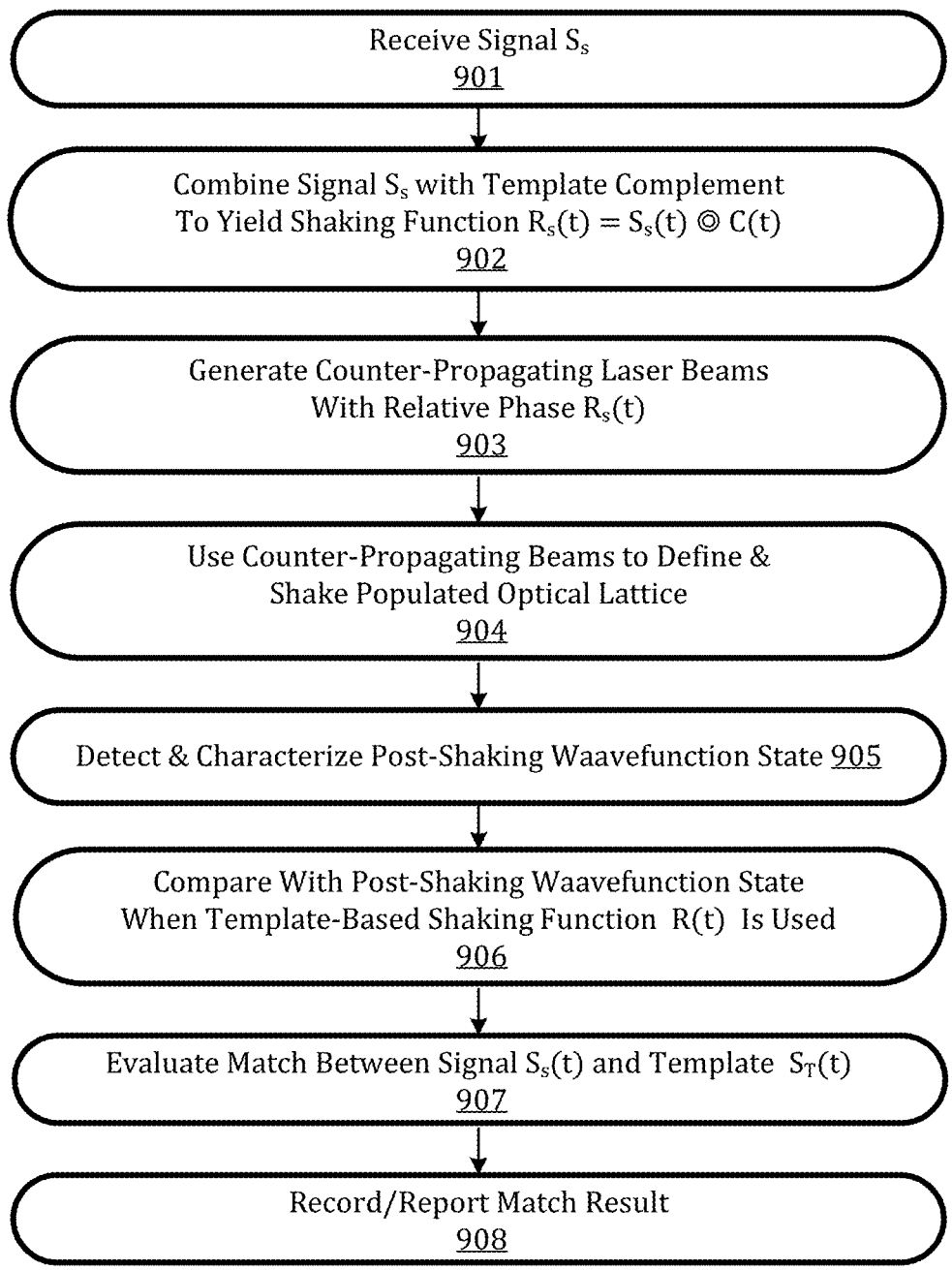
FIG. 9 is a flow chart of a match mode sub-process of the process of FIG. 6.
Figure 10:
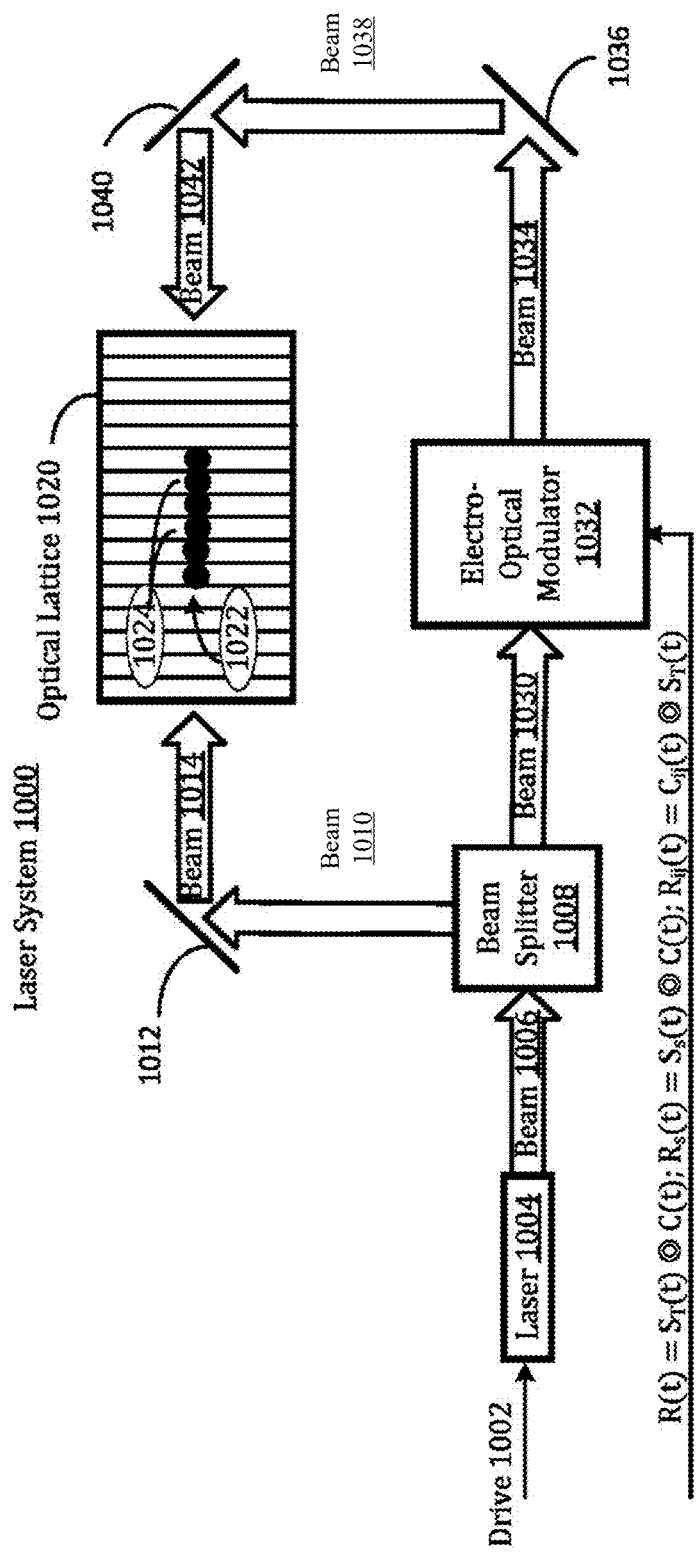
FIG. 10 is an alternative optical subsystem for the shaken-lattice matched-filter system of FIG. 4.

Shaken-lattice match-mode process 420 is flow-charted in FIG. 9. At 901, a signal $S_s$ is received, e.g., by system 400, FIG. 4. At 902, signal $S_i$ is combined with control function C(t) to yield shaking function $R_s(t)=S_s(t) \otimes C(t)$. At 903, the shaking function is used to establish a time-varying relative phase $R_s(t)$ between the counter-propagating laser beams used to establish and shake an optical lattice at 904.

At 905, a post-shaking wavefunction state of molecules in the optical lattice is detected and characterized. The wavefunction characterization for signal $S_s$ is compared to that associated with template $S_T(t)$ at 906. This comparison is used to evaluate a match between signal $S_s(t)$ and $S_T(t)$. The match result can then be recorded and/or reported at 908.

In system 400, a pair of lasers is used to generate the counter-propagating beams that produce the lattice; the shaking function $R_s(t)$ is applied to an electrical drive signal that is used to drive one of the two lasers. In an alternative embodiment, a single laser is used to provide both counter-propagating beams; the phase shift is applied directly to one of those beams. For example, a laser system 1000 applies a drive signal 1002 to a single laser 1004 as the source of both of two counter-propagating beams. Laser 1004 produces beam 1006, which is split by a beam splitter 1008 into two branch beams. A first branch beam 1010 is reflected by a mirror 1012, yielding a beam segment 1014 directed toward optical lattice 1020, which entrains a population 1022 of alkali atoms 1024.

A second branch beam 1030 is input to an electro-optical modulator 1032, which outputs a phase-modulated beam 1034. Beam 1034 is reflected by mirror 1036 to yield beam 1038, which is reflected by mirror 1040 to produce beam 1042. Beams 1014 and 1042 counter-propagate and interfere to create optical lattice 1020. The phase of beam 1042 varies over time relative to beam 1014 due to phase shifts introduced by electro-optical modulator 1032.

The phase shift imposed by electro-optical modulator 1032 is determined by the shaking function received at its control input. In the event the template is combined with control-function C(t), then, by definition, the shaking function R(t) that produces the desired wavefunction-state sequence results. In learning mode, the shaking function is $R_{ij}(t)=C_{ij}(t) \otimes S_T(t)$, produced when a control-function candidate is combined with the template. In match mode, the shaking function; $R_s(t)=S_s(t) \otimes C(t)$, produced when an incoming signal is combined with the control function for the given template.

In another embodiment, an incident wave counter propagates with respect to a reflection of itself. The phase of the reflection relative to the incident wave is varied by moving the mirror (that does the reflecting) back and forth. Thus, an optical lattice formed by the counter-propagating beams can be shaken by controlling the position of the mirror according to a shaking function.

Figure 11:
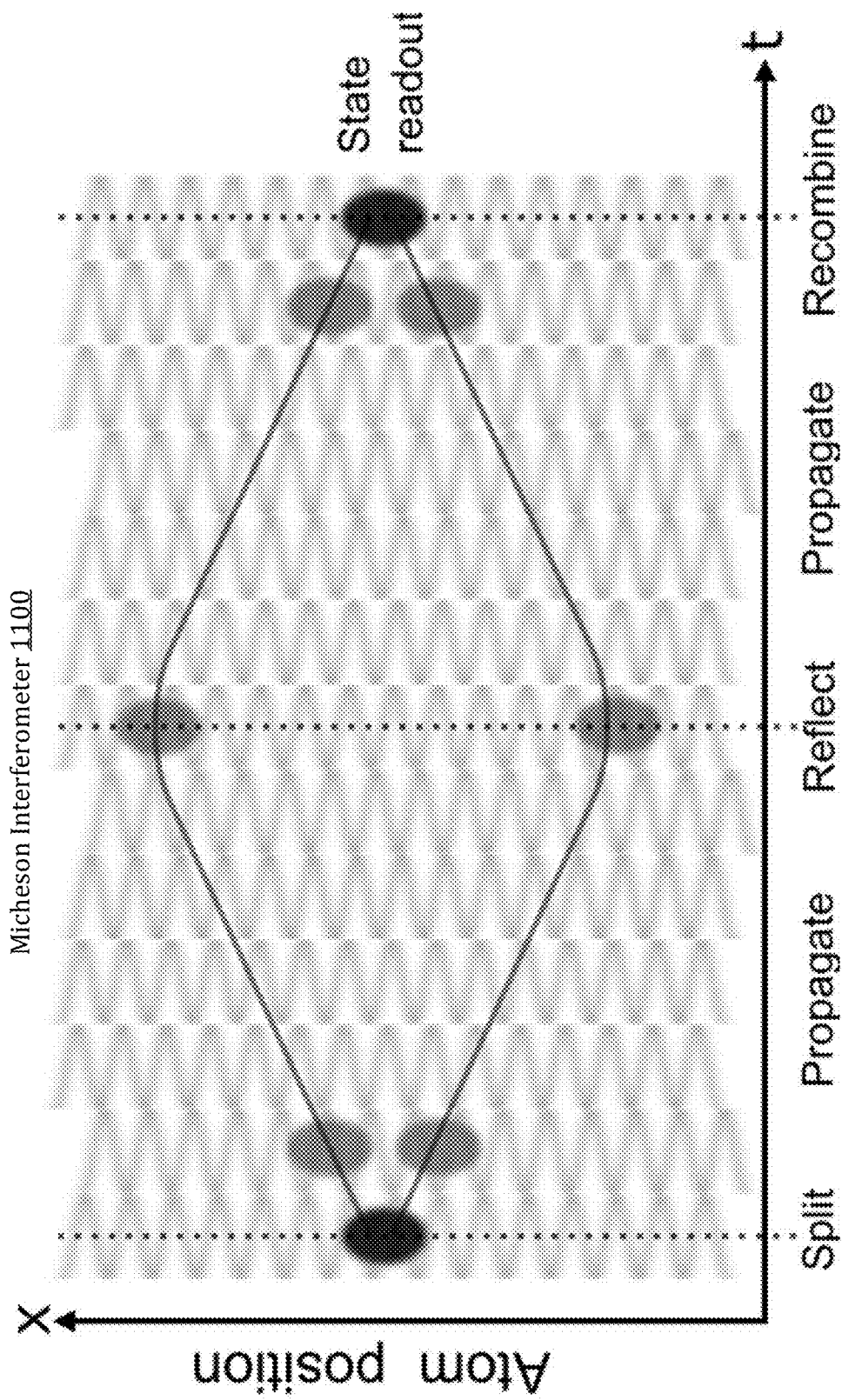
FIG. 11 is a gray-scale reproduction of a diagram of atom paths in a Michelson interferometer.
Figure 12:
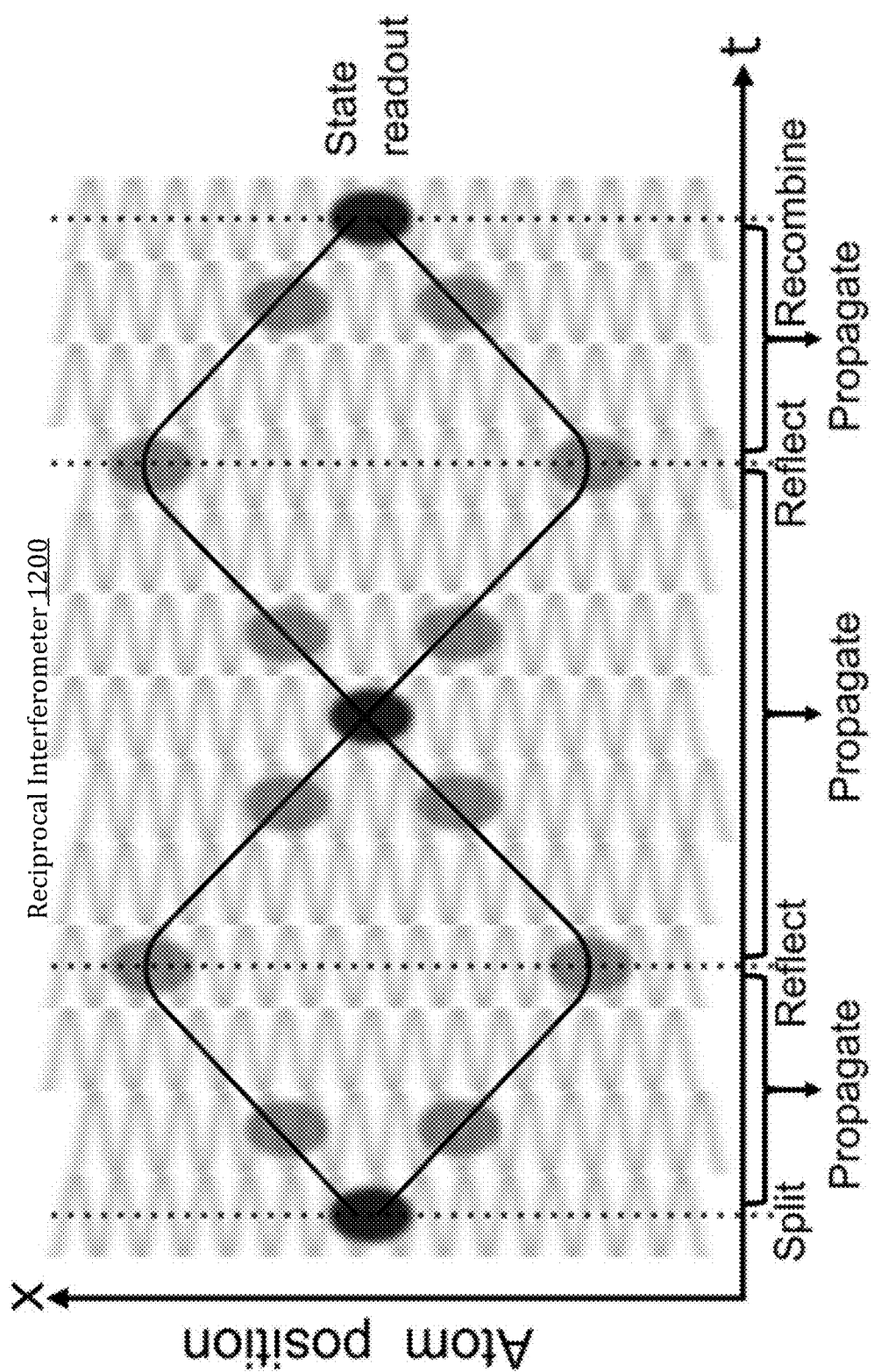
FIG. 12 is gray-scale reproduction of a diagram of atom paths in a reciprocal interferometer.

In the scenario of FIG. 4, there is a single transition from the Bloch ground state of the lattice to the split state. In alternative scenarios, there can be multiple (N>1) transitions leading from the initial wavefunction state to the end wavefunction state. The diagram of FIG. 11 represents a Michelson interferometer 1100 with N=5 transitions: splitting, propagation, reflection, reverse propagation, and recombining. A reciprocal interferometer 1200, represented in the diagram of FIG. 12, uses N=7 transitions: split, propagation, reflection, propagation, reflection, propagation, and recombination. This latter interferometer has proved to be more sensitive than the Michelson interferometer, perhaps due to the greater symmetry of the paths. Details of the physics system used in the interferometer embodiments may be extrapolated from "Shaken Lattice Interferometry" by Carrie A. Weidner, a published Ph.D. thesis submitted 2018 to the University of Colorado and available on the Internet. This thesis is incorporated herein by reference.

In the scenario of FIG. 4, there is a single template. In an alternative embodiment, two or more templates can be introduced and the performance metric is designed so that signals matching any of the templates result in the same end wavefunction. In another embodiment, signals matching different templates result in different end wavefunctions. In a combined learning and match mode variation, the machine learning engine uses a cluster analysis to determine which signals result in which of a set of end wavefunctions.

In system 400, signals are combined with a control function or control-function candidates by a signal adder 430. In other embodiments, signal multiplication and other combining operations are implemented. In addition, the combiner can perform amplitude, frequency, and temporal scaling to conform signals of interest to ranges to which the wavefunctions for the molecules in the optical lattice are sensitive.

In system 400 (FIG. 4), the wavefunctions of interest are associated with neutral rubidium 87 atoms entrained in a one-dimensional optical lattice. In other embodiments, an optical lattice of two or more dimensions can be used. In addition, magnetic-optical traps can be used to confine the particles associated with the wave function. Alternative particles can include other isotopes of rubidium, other alkali metal atoms, other neutral or charged monatomic or polyatomic molecules, photons, electrons and other elementary particles.

Herein, a "signal" is a time-varying field (that may or may not be carrying information). Example fields include electrical, optical, and electro-optical fields. Herein, a "function" is a relation between one or more dependent variables and one or more independent variables such that the values of the independent variables determine the values of independent variables. A function can be a signal but also may be data specifying operations on a signal. Herein, a "wavefunction" is a complex-valued probability amplitude corresponding to a quantum system; the quantum system may, for example, be of an individual particle or a population or distribution of particles. The probabilities for the possible results of measurements made on the system can be derived from the wavefunction. Herein "determining" encompasses selecting, calculating, (empirically) learning, and causing.

Herein, a "wavefunction" is a characterization of a time-varying quantum system, and a wavefunction state is a characterization of a quantum system at a given time. Herein, wavefunction states have the "same form" if they are instances of the same quantum state; wavefunction states have "different forms" if they are respective instances of different quantum states. Different "instances" (e.g., of a control function or of an initial wavefunction state) may occur at different times and/or at different locations, but are otherwise either identical or at least differ at most negligibly. Herein, "based on" means "is a factor in" and does not necessarily exclude other factors.

Herein, "combining" A (e.g., an instance of a control function) and B (e.g., a signal) encompasses adding, multiplying, A modulating B, B modulating A, generating the result of a function of A and B, generating the result of A(B) where A is a function and B is an independent variable, generating the result of B(A), where B is a function and A is an independent variable. Herein, a control function can be a time-varying potential or data indicating how a signal combiner is to act on an incoming signal. Likewise, a recipe function can be a time-varying potential or data instructing a physics system how to operate on wavefunctions.

Herein, "encompasses" means "includes but is not limited to". Herein, "applying" is analogous to "executing" but results in a physical transformation (as opposed to a computer result). Herein, "rating" means differentiating better (e.g., better performing control-function candidates) from worse (e.g., worse performing control-function candidates) according to some performance metric. Herein, a "performance metric" includes a standard for evaluating entities (e.g., control-function candidates), and may include a criterion for ending a search for a control function.

Herein, all art labelled "prior art", if any, is admitted prior art. All art not labelled "prior art", if any, is not admitted prior art. The embodiments described herein, variations thereupon, and modifications thereto are provided for by the present invention, the scope of which is defined by the following claims.

What is claimed is:

1. A method comprising:
   receiving a signal S;
   combining signal S with a control function C to yield a recipe function R;
   adjusting, according to the recipe function R, one or more lasers generating an optical lattice holding one or more atoms in a first state, thereby producing a second state of the one or more atoms held in the optical lattice;
   generating one or more measurements of the one or more atoms held in the optical lattice in the second state; and
   updating, by a machine-learning engine, the control function C based on the one or more measurements and a performance metric so as to update control function C.

2. The method of claim 1 wherein control function C is generated based on a control-function characterization [C].

3. The method of claim 1 wherein the receiving, combining, adjusting, generating and updating are performed iteratively so as to result in a control function C'.

4. The method of claim 3 further comprising iteratively performing a non-adaptive series of actions including, receiving a signal S';

combining signal S' with control function C' to yield a recipe function R';
   adjusting, according to the recipe function R', the one or more lasers generating the optical lattice holding the one or more atoms in a state n, thereby producing a state n' of the one or more atoms held in the optical lattice; and
   generating one or more measurements of the one or more atoms held in the optical lattice in the state n'.

5. An adaptive quantum signal processor (AQSP) system comprising:
   a signal combiner for combining incoming signals S with respective control functions C to yield respective recipe functions R;
   a physics system comprising one or more lasers configured to generate an optical lattice for holding one or more atoms, the physics system configured to adjust the one or more lasers according to the respective recipe functions R so that the one or more atoms in the optical lattice transition to a respective updated state of the one or more atoms in the optical lattice;
   a measurement system for generating one or more respective measurements of the respective updated states of the one or more atoms in the optical lattice; and
   a machine-learning engine for updating control functions C based on the respective one or more measurements.

6. An AQSP system as recited in claim 5 wherein the machine-learning engine has an adaptive mode and a non-adaptive mode, wherein the machine-learning engine, while in the adaptive mode, updates control functions in response to wavefunction characterizations [$\Psi_n$], and wherein the machine-learning engine, while in the non-adaptive mode, does not update control functions in response to wavefunction characterizations.

7. An AQSP system as recited in claim 5 further comprising an output generator for providing an output Z that characterizes at least some signals S.

8. An AQSP system as recited in claim 5 including an output generator that provides an output Z indicating that a signal S matches a template.

9. The method of claim 1, wherein the one or more lasers include two lasers that generate respective counter-propagating laser beams.

10. The method of claim 1, wherein the one or more atoms are atoms of rubidium-87.

11. The method of claim 1, wherein combining the signal S with the control function C comprises providing the signal S and the control function C to a signal adder.

12. The method of claim 1, wherein the recipe function R is a time-varying shaking function that indicates how to vary a phase of a beam produced by the one or more lasers.

13. The method of claim 1, wherein generating the one or more measurements of the one or more atoms held in the optical lattice in the second state comprises determining whether or not adjusting the one or more lasers according to the recipe function R produced a split population of the one or more atoms.

14. The method of claim 13, wherein generating the one or more measurements of the one or more atoms held in the optical lattice in the second state further comprises determining a separation between populations of the one or more atoms.

15. An AQSP system as recited in claim 5, wherein the one or more lasers include two lasers that generate respective counter-propagating laser beams.

16. An AQSP system as recited in claim 5, wherein the one or more atoms are atoms of rubidium-87.

17. An AQSP system as recited in claim 5, wherein the signal combiner comprises a signal adder.

18. An AQSP system as recited in claim 5, wherein the respective recipe functions R are time-varying shaking functions that indicate how to vary a phase of a beam produced by the one or more lasers.

19. An AQSP system as recited in claim 5, wherein the measurement system is configured to determine whether or not adjusting the one or more lasers according to the respective recipe functions R produced a split population of the one or more atoms.

20. An AQSP system as recited in claim 19, wherein the measurement system is further configured to measure a separation between populations of the one or more atoms.

* * * * *